Patented Jan. 13, 1931

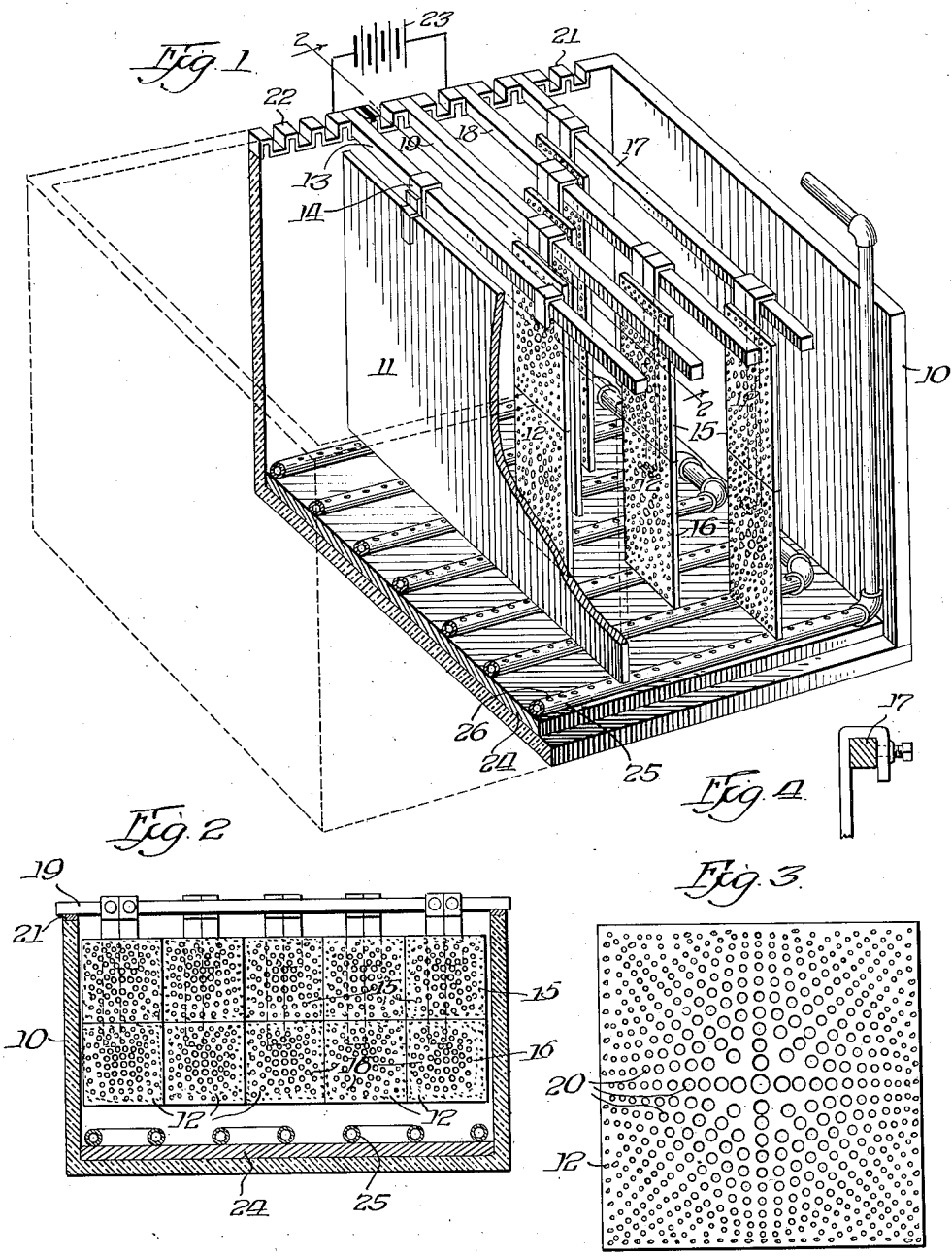

1,788,462

UNITED STATES PATENT OFFICE

GEORGE F. JOHNSTONE, OF CHICAGO, ILLINOIS

ETCHING MACHINE

Application filed April 28, 1927. Serial No. 187,384.

The invention relates to etching machines such as shown and described in Patent No. 1,442,977, issued to Edward G. Schwuchow and me, January 23, 1923.

The present invention is designed to accomplish etching of plates which are of a different character from those capable of being successfully etched by the machine disclosed in the above mentioned patent.

The present invention is particularly designed to etch plates, preferably of zinc and similar metal, and employs elements and an arrangement thereof whereby the action of the electrolyte upon the plate results in a substantially even depth of etch throughout the surface of a plate of this or allied material.

It is one of the prime objects of the invention to provide a construction, certain elements of which are capable of manipulation so that the action of the electrolyte may be varied to thus accomplish a variable action upon the plate and thereby cause a desired etch to be accomplished upon the face of the plate.

It is another object of the invention to employ a plurality of electrodes, all of which co-operate with each other and are capable of adjustment relatively to each other and relatively to the plate to be etched to thereby produce the above mentioned advantage.

It is an added feature of the invention to provide a means, in combination with the means above referred to, for agitating the electrolyte to thereby assist in removing the etched particles from the plate, thus preventing their interference with the etching process, the agitation also preventing polarization of the electrodes.

It is also an object of the invention to employ electrodes arranged as described which are capable of adjustment relatively to each other and adjustable relatively to the plate to be etched, the electrodes having apertures provided therein which vary in dimension relatively to each other, with the apertures of larger dimension located at or adjacent the center of the plate.

The invention has these and other objects, all of which will be explained in detail and more readily understood when read in conjunction with the accompanying drawings which illustrate one embodiment of which the invention is susceptible, it being obvious that changes and modifications may be resorted to without departing from the spirit of the appended claims forming a part hereof.

In the drawings,

Fig. 1 is a perspective view of an etching machine embodying the features of the invention;

Fig. 2 is a section taken on line 2—2 of Fig. 1;

Fig. 3 is a front view of one of the electrodes; and

Fig. 4 is a view of a detail of construction.

The construction illustrated for accomplishing the invention includes a tank 10, in which a suitable electrolyte is contained, which is directed toward the plate 11 to accomplish etching by means including the electrodes generally designated 12. The plate 11 is hung within the tank 10 by means of a conductor 13 which, in the present instance, is rested upon the edges of the opposite sides of the tank, the plate being connected with the bar or conductor 13 by means of the hangers 14—14. The electrodes generally designated 12 consist of pairs of electrodes 15 and 16, one or more pairs being supported by bars or conductors, respectively designated 17, 18 and 19, the several pairs of electrodes being arranged in converging relation, with one electrode bridging the space produced between certain other of said electrodes so that all of the electrodes may act upon the plate or article to be etched. The electrodes 15 and 16 are each supported by a separate hanger and therefore may be moved lengthwise upon the bars or may be mounted upon one of the adjacent bars depending upon the particular work to be performed upon the plate to be etched.

It will be noted, by referring to Fig. 1, that the several electrodes are located relatively to the plate to be etched so that the action of all of the electrodes is applied to the face of the plate, and since said electrodes may be adjusted, one with respect to the other, the resulting action of the electrodes upon the plate may be varied to result in the accomplishment of the desired end.

Each of the electrodes is provided with a series of apertures 20 which vary in diameter, the larger apertures being located adjacent the center of the electrodes and are spaced a relatively greater distance apart from each other at the center than at the edges of the plate.

The conductors 17, 18 and 19 are held with respect to the tank and in electrical contact with each other through the medium of the recessed or notched bars 21 secured to the opposite sides of the tank, within which recesses the conductors, such as 17, 18 and 19, are located. The bar 21 is connected by means of a conductor with a source of current 23, the latter of which is also in electrical connection with the conductor 22 with which the conductor 13 which carries the plate to be etched is also in contact. A conductor 24 is located upon the base of the tank, the conductor being employed to assist in reducing the time necessary for etching the plate.

Means is provided for preventing polarization of the electrodes and their becoming coated with the material etched from the plate and also to assist in removing particles from the plate during the etching operation to thereby present a new face to the action of the electrolyte during the etching operation. This means in the present instance includes the pipe 25 which is connected with an air pump (not shown) for forcing air through the pipe, certain portions of the pipe being provided with apertures 26 for allowing the introduction of air into the electrolyte to thus agitate the electrolyte and prevent accumulation of material upon the electrodes and cause the removal of the particles etched from the plate.

By referring to Fig. 1, it will be noted that a plurality of pairs of electrodes is arranged upon certain of the conductors or supporting bars and that each pair is separated from the other a suitable distance upon said conductor, with the pairs of electrodes arranged upon an adjacent bar also arranged in spaced relation to each other and bridging the space produced between the first mentioned pairs of electrodes, the space provided between the last mentioned electrodes being bridged by a single pair of electrodes, and thus the action of each pair of electrodes upon the plate to be etched is varied, providing a means whereby a differential action of the electrodes results which eliminates the production of a plate in which one part is etched to a greater extent than another.

It has been found that a plate of material, particularly zinc, of which printing plates or cuts are produced, will be etched to a different depth at the center of the plate than at the sides or edges of the plate, and that this may be eliminated by arranging one of the electrodes a greater distance from the plate with the remaining electrodes arranged a variable or gradually decreasing distance from the plate.

It is evident that the arrangement disclosed is capable of manipulation so that one or more of the separate electrodes of each pair may be arranged and positioned relatively to the plate to be etched so that any desired depth of etch may be accomplished upon different portions of the plate.

From the foregoing explanation of the construction, it is manifest that an arrangement is disclosed whereby the advantages just referred to are obtainable and in which the particles etched from the plate are removed therefrom and also that polarization of the electrodes is prevented.

Having thus described the invention, what I claim and desire to cover by Letters Patent is:

1. In an etching machine, the combination of a plurality of divergently arranged electrodes, one of which is movable relatively to another and movable relatively to the plate to be etched.

2. In an etching machine, the combination of a plurality of convergently arranged electrodes, located opposite a plate to be etched, said electrodes having apertures provided therein of varying dimensions with the larger apertures arranged adjacent the center of the electrodes.

3. In an etching machine, the combination of a plurality of separate electrodes, one of which is arranged in juxtaposition to another, the combined area of said electrodes substantially corresponding to the area of the plate to be etched, said electrodes being arranged opposite said plate.

4. In an etching machine, the combination of a plurality of electrodes, said electrodes being arranged in spaced relation to each other in one direction, and being laterally offset relatively to each other in the opposite direction.

5. In an etching machine, the combination of a plurality of electrodes, a tank in which said electrodes are located, said electrodes being supported in said tank in spaced relation to one another in one direction and being arranged in overlapping relation to one another in the opposite direction.

6. In an etching machine, the combination of a plurality of electrodes arranged relatively to each other to co-operate with each other to etch one face of an article, each of said electrodes being located at relatively different distances from the article, and one of said electrodes being arranged laterally of another adjacent electrode.

7. In an etching machine, the combination of a plurality of electrodes, said electrodes being arranged in spaced relation to each other in one direction and being laterally offset relatively to each other in the opposite direction, and said electrodes having openings provided therein.

8. In an etching machine, the combination of a plurality of electrodes, said electrodes being arranged in spaced relation to each other in one direction and being laterally offset relatively to each other in the opposite direction, and said electrodes having openings of different dimensions provided therein.

9. In an etching machine, the combination of a plurality of electrodes, said electrodes being arranged in spaced relation to each other in one direction and being laterally offset relatively to each other in the opposite direction, and said electrodes having openings of different dimensions provided therein, the larger openings being located adjacent the center thereof.

In witness whereof, I hereunto subscribe my name this 16th day of April, A. D. 1927.

GEORGE F. JOHNSTONE.